Nov. 15, 1960

H. W. ATKINS 2,960,679

AIRCRAFT WARNING SYSTEM

Filed Aug. 2, 1955

INVENTOR.
HAROLD W. ATKINS
BY
Williamson, Schroeder, Adams, & Meyers
ATTORNEYS

Nov. 15, 1960 H. W. ATKINS 2,960,679
AIRCRAFT WARNING SYSTEM
Filed Aug. 2, 1955 2 Sheets-Sheet 2
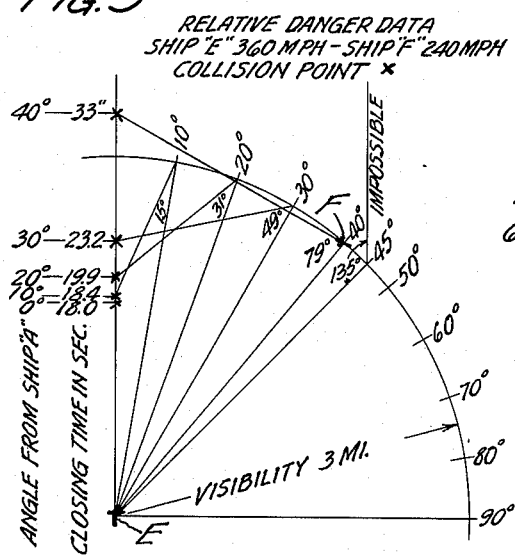
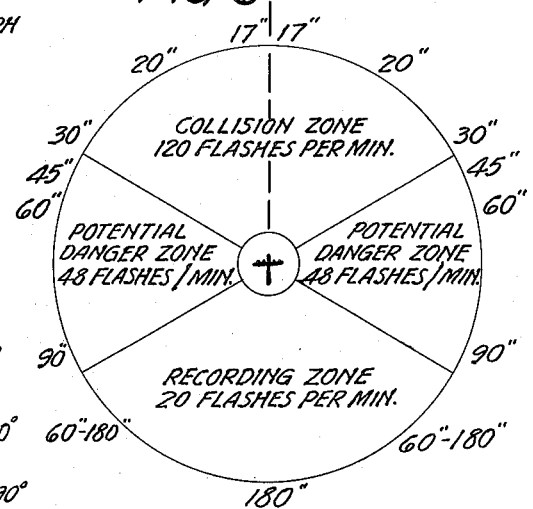
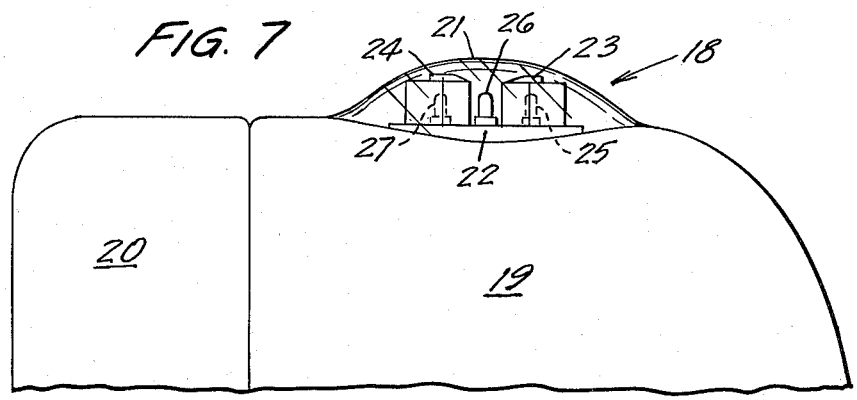
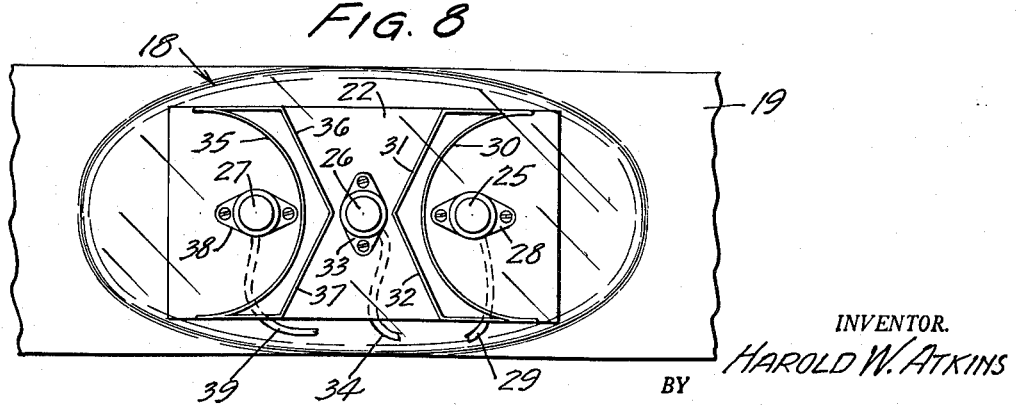
INVENTOR.
HAROLD W. ATKINS
BY
Williamson, Schroeder, Adams & Meyers
ATTORNEYS

United States Patent Office 2,960,679
Patented Nov. 15, 1960

2,960,679

AIRCRAFT WARNING SYSTEM

Harold W. Atkins, 1910 E. Old Shakopee Road,
Minneapolis, Minn.

Filed Aug. 2, 1955, Ser. No. 525,982

3 Claims. (Cl. 340—25)

This invention relates to an aircraft warning system and more particularly to apparatus and a method for advising a pilot of one aircraft of relative danger of collision with another aircraft which may be flying in the same vicinity.

It has long been evident to pilots of aircraft that the danger of collision with another aircraft is a serious problem which cannot be met in the same manner as employed in directing vehicle traffic on the ground. The driver of an automobile has the benefit of prescribed roads or pathways, the existence and direction of which he can observe continuously as he travels therealong. Furthermore, the driver can observe other vehicles in relation to fixed, visible objects which furnishes a reference for relative position and therefore, renders judgment as to probable collision an easy task. The problem of traffic on the ground is therefore one of alertness rather than pre-judgment of the danger of collision over a span of several miles' distance between the vehicles.

Airplanes in flight, on the other hand, are not positioned relatively with any visible reference object and hence, the pilots of two aircraft in the same vicinity have no means of determining the probability of collision except by observing apparent, relative movement and observing whether the other aircraft appears to be growing larger or smaller in size. Under conditions of good visibility in daylight, each pilot may observe the orientation of the other aircraft when they are relatively close, say within three miles apart.

However, when visibility is poor, as during snowstorms and other bad weather conditions and twilight conditions as at dawn and dusk and during nighttime, each pilot must then rely entirely upon relative movement of the visible lights which form a part of the standard equipment of all aircraft. Unfortunately, pronounced relative movement of any light on another aircraft with respect to the pilot's position in his aircraft signifies only a situation in which danger of collision is relatively small.

On the other hand, if any light on an aircraft which is observed by the pilot of another does not move relative to his position, that is, where the light will maintain its location at a fixed point through his windshield, then the danger is extremely great since such condition portends a certain collision unless evasive action is undertaken by one or the other of the pilots in ample time. A number of intermediate conditions may exist where a light borne by another aircraft appears to move at a relatively slower or greater rate with respect to the position of the pilot in his cab. The danger of collision is then greater or less in relation thereto.

To summarize the above observations, the definition of a collision course is any course taken by two aircraft where the relative angles between them remain constant until they collide. If there is any change in the angles or speeds of the two airplanes, they will deviate from a collision course and will not collide.

From the foregoing, it would appear that a pilot need only exercise a moderate degree of alertness to avoid collision between his plane and that of another in his vicinity.

However, as will be demonstrated in the following specification, the high speeds of modern day aircraft make the probability of a collision a certainty within a prescribed time limit which is reached before evasive action is taken. For example, an ordinary large transport airplane, travelling at 300 miles per hour or over, cannot be turned in less time than fifteen seconds. In other words, if a collision course has been established between two airplanes, each of which is going at a speed in the vicinity of 300 miles per hour and neither of the pilots has established evasive action prior to the closing of the last fifteen seconds prior to collision time, then there is no possible way in which collision can be avoided.

The closing speeds of average transport airplanes lies in the neighborhood of seven hundred feet per second up to as high as fifteen hundred feet per second. In some instances, the closing speed of present day transports are calculated in the neighborhood of one thousand fifty-six feet per second, which is actually faster than the speed of a conventional 45 caliber bullet. It can be well appreciated that objects hurtling through the air at such speed must be maintained off from a collision course rather than diverted therefrom in view of the high speed and momentum of the aircraft and the relatively slow reaction time of the controls of such aircraft.

Authentic data shows that between the years 1946 and 1954, there have been, in the United States, 196 mid-air collisions involving civil aircraft. 86% of these collisions occurred within five miles of an airport and 90% of them occurred at or below three thousand feet altitude. There is of course, no available data on how many of the collisions were caused by inadvertence on the part of a pilot nor how many of the accidents were unavoidable in spite of care and alertness on the part of the pilot. In any event, it appears evident that the uneventful, daily flights of a large number of aircraft occur merely because the sky, with its vast space, makes the chances for a collision course to be established between two aircraft, rather remote. On the other hand, where a collision course has once been established, it would appear that an extremely high percentage of such collision courses actually do result in fatal collisions. It further appears evident that with congestion of aircraft on the increase every year, the probability of collision courses being established between any two of a great multiplicity of planes becomes so great that despite the vast, unobstructed area of the sky, a startling number of collision courses may actually be established in a day's time in the foreseeable future. Now, when it is further considered that a high percentage of collision courses actually result in collisions, the problem becomes of such gravity that a solution therefor must be found or air travel will be unduly restricted and regimented to the detriment of aeronautics in general.

It is therefore within the contemplation of this invention and an important object thereof to provide a novel apparatus and method for preventing dangerous collision courses from ever becoming established between any two aircraft in the same vicinity to the end that collision accidents will be reduced to a minimum.

It is another object of this invention to provide a warning system which is economical in construction, long lasting and reliable in performance and which will require but a minimum of upkeep in order to safeguard aircraft against collision under conditions of poor visibility.

It is a further object of this invention to provide an apparatus and method for establishing a signal system between aircraft in flight which will give an indication of relative danger in accordance with the relative angles of travel between the aircraft through use of visible light mounted on each aircraft, having characteristics peculiar only to a range of angles falling within an arbitrary zone established according to the relative probability of collision.

A still further object of the invention is to provide a method of warning pilots of aircraft in the same vicinity by use of flashing lights of high intensity at a rate which will be in accordance with the relative danger of collision and shielding the light so that it will be visible only to another plane, the position of which is such as to permit the pilot to view the light and be guided accordingly.

These and other objects and advantages of my invention will more fully appear from the following description made in connection with the accompanying drawings wherein like reference characters refer to similar parts throughout the several views and in which:

Fig. 5 is a chart showing a series of angular collision courses between two airplanes travelling at widely different speeds and showing the respective times prior to collision under the various conditions;

Fig. 6 is a composite chart averaging collision times and collision angles for the purpose of establishing workable angular sectors for establishing differential light signals to warn the pilot of another aircraft of the probability of collision between the aircraft involved;

Fig. 7 is a side view of a simple form of my apparatus in which lights and shields are shown mounted to a convenient segment of an aircraft, having been designed with reference to the composite data set forth in Fig. 6;

Fig. 8 is a top view of the apparatus shown in Fig. 7 and disclosing the shield arrangement defining visible sectors for each of the signal lights in accordance to relative danger zones established according to my invention.

Figure 1:
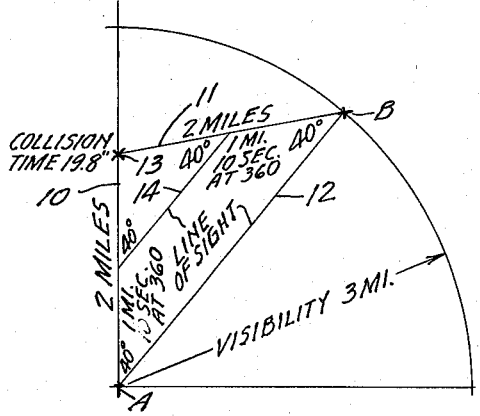
Fig. 1 is a chart showing two airplanes, both travelling at the same rate of speed on a collision course and signifying the relative angles prior to collision as well as the time of flight from an initial three miles visibility range.

With continued reference to the drawings and particularly to Fig. 1, a situation is there indicated where an aircraft A is flying along a projected pathway 10 at a speed of 360 miles per hour. A second airplane B is travelling also at 360 miles per hour along a projected pathway 11 and at a distance of three miles apart, along a line of sight 12, as indicated. The angle between the projected pathway 10 of plane A and the line of sight, is 40 degrees. Since the projected pathways 10 and 11 are on a collision course, the angle between the projected pathway 11 of plane B and the line of sight 12 will also be 40 degrees. The point of collision is indicated at 13. By calculation, it is determined that it takes each plane A and B 19.8 seconds from the initial positions thereof up to the time of collision. A second line of sight 14 exists when each of the planes A and B have travelled one mile along the projected respective lines of flight and it will be observed that plane A when one mile along its course, will remain on a 40 degree sight line with respect to plane B and vice versa. As will be observed, the line of sight between planes A and B will remain at exactly the same angulation with respect to their lines of flight for the entire length of time prior to collision. Plane B will therefore appear to be motionless with respect to the pilot of plane A and the converse is also true with respect to the pilot of plane B. Under conditions of ideal visibility, each plane will merely enlarge in size while remaining stationary with respect to the pilot from his observation point until collision finally occurs.

Figure 2:
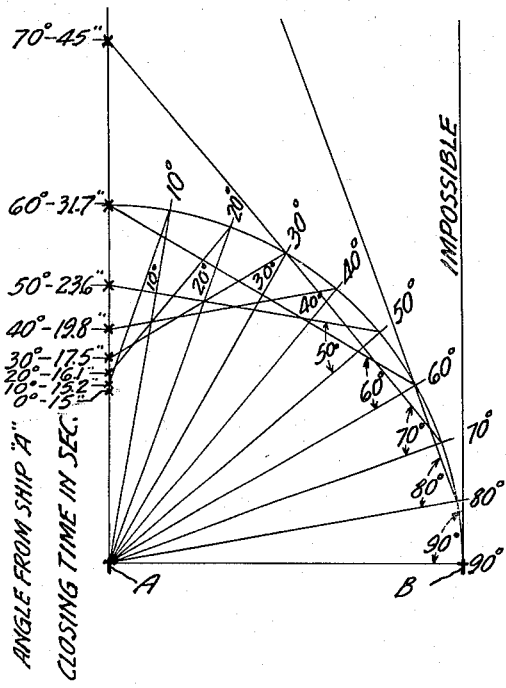
Fig. 2 is a chart representing various collision courses which may be assumed by the same airplanes referred to in Fig. 1, the relative angles and times prior to collision being indicated thereon.

Referring now to Fig. 2, the same aircraft A and B are shown in a variety of very angular relationships, each starting from a position three miles from the other. All of the initial distances selected herewithin are taken as three miles since that distance is the visibility range set down by present legal aeronautical minimum standards. Each of the courses are designated as collision courses since they will result in a given time in collision between the planes A and B, under the conditions set forth in the chart. It will be observed that the closing times ranging from a head-on, or zero degree angulation, are as follows:

I

| | |
|---|---|
| 0 degrees | 15.0 seconds. |
| 10 degrees | 15.2 seconds. |
| 20 degrees | 16.1 seconds. |
| 30 degrees | 17.5 seconds. |
| 40 degrees | 19.8 seconds. |
| 50 degrees | 23.6 seconds. |
| 60 degrees | 31.7 seconds. |
| 70 degrees | 45.0 seconds. |
| 80 degrees | 1 minute 27 seconds. |
| 90 degrees | Impossible. |

When the planes are flying head-on under the prescribed conditions in the chart of Fig. 2, the closing time is 15.0 seconds. Now, however, since it takes about fifteen seconds for a conventional modern day transport to begin to deflect its course when the controls are moved for evasive action, no effort on the part of the pilot can avoid a collision where he does not observe the other plane at a distance greater than the three mile range set forth. Since flying conditions of three mile visibility are permitted as a minimum standard, it can therefore be seen that a collision course which is dead ahead or head-on under the minimum flying standards will result in a certain collision. Each of the other conditions of angulation between the projected lines of flight of the planes A and B result in varying closing times and fifteen seconds should be subtracted from each of these figures to arrive at the minimum period during which a pilot must respond to the danger stimulus and control the plane for evasive action. Thus, at 30 degrees, either of the pilots will have but 2.5 seconds in which to initiate evasive action and even at 40 degrees each pilot has but 4.8 seconds in which to act. When the angulation is above 60 degrees, ample time is permitted for the evasive action and collision can then be easily avoided.

Figure 3:
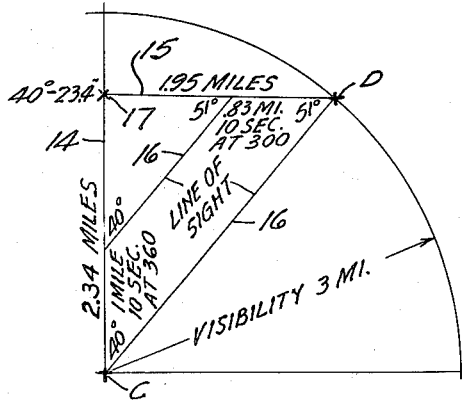
Fig. 3 is a chart showing a collision course established between an airplane travelling at a greater rate of speed than that of another and showing relative angles assumed in such instance during the time prior to collision.

Referring now to Fig. 3, a special set of circumstances are set forth in which airplane C is travelling along a projected pathway 14 and ship D is travelling along a projected pathway 15. The line of sight between the ships is indicated at 16. The ship C travels at a rate of 360 miles per hour while the ship D travels at a rate of 300 miles per hour. If the planes are on a collision course, the line of sight 16 remains the same but the relative angles between the line of sight and the projected pathways are different for each of the ships.

In the instant case, such angle is 40 degrees for ship C and 51 degrees for ship D. The ship C travels 2.34 miles to the collision point 17 while the ship D travels 1.95 miles to the same collision point. The collision time for the planes to travel from their three mile initial separation is 23.4 seconds. The time in which a pilot may initiate evasive action is thus 8.4 seconds under the conditions set forth in chart 3.

Figure 4:
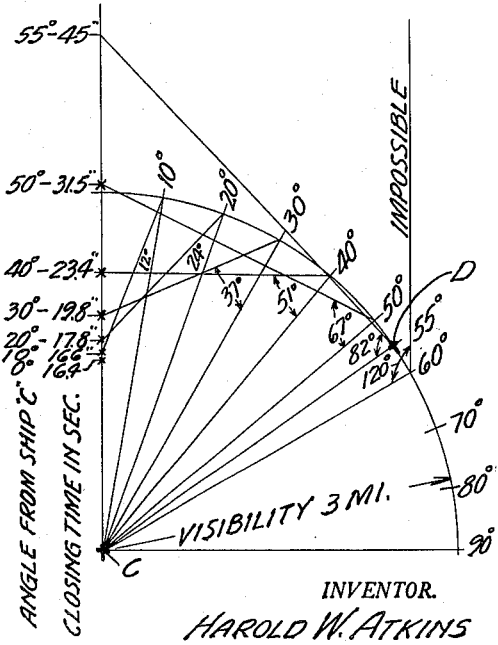
Fig. 4 is an extended chart showing various relative angles and collision times of airplanes travelling at the respective speeds set forth in Fig. 3.

A variety of relative angles in the respective lines of flight are set forth in Fig. 4, the ship C travelling at 360 miles per hour and the ship D travelling at the rate of 300 miles per hour. The closing times at the various angulations are established as follows:

II

| | | |
|---|---|---|
| 0 degrees | seconds | 16.4 |
| 10 degrees | do | 16.6 |
| 20 degrees | do | 17.8 |
| 30 degrees | do | 19.8 |
| 40 degrees | do | 20.4 |
| 50 degrees | do | 31.5 |
| 55 degrees | do | 45.0 |
| 60 degrees | | Impossible. |

It will be noted that the closing time under the conditions set forth in the chart of Fig. 4 are 16.4 seconds for a dead-ahead course. Here, either pilot will have but 1.4 seconds in which to take evasive action. Because of the slower speed of ship D, it requires a somewhat longer time for collision to occur than under the conditions set forth in charts 1 and 2. The slower plane now must head out a little further when it is on a collision course. It will be noted that irrespective of variations between the relative flights of the planes as long as the ships fly at constant speed and in a straight direction on their collision courses, the relative line of sight remains the same and each of the planes will appear to be stationary to the pilot of the other plane.

To further illustrate a set of collision courses under varying conditions of relative angulation between ships travelling at 360 miles per hour and 240 miles per hour respectively, the chart shown in Fig. 5 has been prepared. Here the ship E travels at the 360 miles per hour rate and the ship F travels at the slower rate of 240 miles per hour. The data as to closing time at various angulations between the line of flight and line of sight, is as follows:

III

| | | |
|---|---|---|
| 0 degrees | seconds | 18.0 |
| 10 degrees | do | 18.4 |
| 20 degrees | do | 19.9 |
| 30 degrees | do | 23.2 |
| 40 degrees | do | 33.0 |
| 45 degrees | | Impossible. |

Under the head-on or zero degrees situation at the minimum three mile visibility range, each pilot now has 3.0 seconds in which to initiate evasive action to avoid a head-on collision. The allotted time for evasive action increases with the angle between the line of sight of the pilot of ship E and his projected course until a parallel line of flight is established at 45 degrees where there cannot be a collision, no matter how much time is involved.

From the foregoing data and from additional data which I have compiled under various conditions of speed and mass for a wide variety of present day aircraft, I have determined that an average closing time for a head-on collision course at the minimum three mile visibility range will be approximately 17 seconds, in the vicinity of 45 degrees between the sight line and the projected line of travel of a given aircraft. The average closure time goes up to approximately 20 seconds. Continuing at 50 degrees the closure time averages around 30 seconds and at 60 degrees the closure time jumps sharply to an average of 45 seconds. From 60 degrees to 120 degrees, the closure time under the same average conditions will run from about 45 seconds up to a minute and a half. From the 120 degree angulation to the straight away 180 degrees, the closure time under the aforesaid average conditions runs from one to three minutes and depends considerably upon the differential speed between that of the plane from which the angle is measured and the speed of the other airplane which is overtaking the first.

Reducing the foregoing observations to an arbitrary expression of relative danger, I have devised the following three classes of relative danger:

IV

| | |
|---|---|
| 0 degrees—60 degrees | Collision. |
| 60 degrees—120 degrees | Danger. |
| 120 degrees—180 degrees | Recording. |

In the zero to 60 degree zone which I have designated the collision zone, the pilot under average conditions will have less than 30 seconds to make a decision to deviate from a collision course. It is therefore desirable that within such sector, the pilot should have positive, alarming and decisive warning to tell him that violent evasive action is necessary.

In the sector or zone range from 60 degrees to 120 degrees and under the same average conditions heretofore specified, I elect to call this a danger zone. Here the pilot will have from about 45 to 90 seconds prior to collision and will have time in which to take a corrective measure, but not necessarily a violent one.

In the sector or zone defined by the 120 degree to 180 degree angulation, I have designated the degree of danger as merely of recording interest. Thus, where planes are traveling in the same direction and at the same rate of speed, there is no danger whatsoever of collision and it is only necessary that the position of the other plane be recorded from time to time with little or no corrective measures being required.

Charting an average set of conditions for an airship having a speed in the range of a normal commercial transport plane, the sectors are preferably in the order of those shown in Fig. 6. The warning light which designates imminent collision, has been so positioned and baffled as to be visible for 60 degrees to either side of the projected pathway of travel of the plane. This sector has been called the collision zone. The second warning light, which is designated the potential danger signal for the conditions outlined, has been made visible through a baffling arrangement through a sector of 60 degrees at each side of the plane and immediately adjoining the aforesaid collision zone sectors. The remaining sector which completes the 360 degrees of zone about the plane, is designated as the recording zone and is directly rearward of the plane. In the average circumstance shown, this recording zone has been selected at 60 degrees on either side of the line of travel of the plane and is so baffled that the light having the lowest frequency of flashing is visible only in this 120 degree zone.

The apparatus which I have devised for my warning system is shown in Figs. 7 and 8 in representative form and it is understood that the position of mounting as well as the individual positions and the baffling of the lights can be varied substantially while still accomplishing my general purpose. In the form shown in Fig. 7, the light and baffle assembly is closely grouped and is indicated generally by the Figure 18. The assembly 18 is mounted in streamlined fashion at the top of the tail 19 of an airplane, the remainder of the fuselage being omitted from the view. The rudder 20 may be disposed rearwardly of the position where the light and baffle assembly 18 is mounted. A suitable streamlined plastic bubble 21 may be provided to prevent eddy currents and to protect the individual parts of the assembly from being damaged during flight. The assembly comprises a base 22 having a forward baffle 23 and a rearward baffle 24 rigidly mounted so as to provide reflector surfaces and shields so directed as to prevent the beaming of certain of the lights in zones where the particular signal is not indicated. A light source 25 is disposed forwardly of baffle 23 for signalling imminent danger. The light 26 is disposed between the baffles 23 and 24 so that it may be viewed from either side of the plane in the particular zone designated as a potential danger zone. A third light 27 is disposed within the baffle 24 so that its light is visible only rearwardly of the plane for the purpose of recording rather than indicating that evasive action is required. Although the lights and baffles may be spread out or consolidated on another convenient point upon the fuselage of the ship, I prefer the tail structure because it is the highest point on the average plane and hence, is more easily visible to the other pilots in the vicinity. Furthermore, the high mounting of the assembly assists in protecting the device against breakage.

Referring now to Fig. 8, I there show an enlarge top plan of the device in its tail mounted position. The base 22 is mounted in the tail and is provided with a special lamp socket 28 within which the light 25 is positioned. A high tension pair of lead wires 29 may be connected to a suitable source of energy for intermittently flashing the bulb 25 at a high rate for indicating imminent danger as previously pointed out. The baffle 23 shields this light so that it is reflected and visible only in the forward 120 degree zone. The curved surface 30 of the baffle 23 may provide a reflector for the light and the baffle may be further provided with a rearward angulated reflector surface 31 at one side and 32 at the other side, as shown. A light socket 33 is mounted centrally of base 22 and is adapted to retain the light 26 which is energized by a high tension pair of leads 34 which in turn are intermittently energized at a slower rate than that of the forward light 25. The rear baffle 24 has a rearwardly curved reflector surface 35 and a forward angulated reflector surface 36 at one side and 37 at the other. The angulated surfaces 31 and 36 provide a restricted light zone to the one side of the tail 19 of the airship and the angulated reflector surfaces 32 and 37 provide a duplicate light zone at the other side of the ship. The two side zones, as previously pointed out, are the potential danger zones and the single light 26 may function as a signal for both sides of the ship. At the rear in the base 22 is mounted a socket 38 within which a light 27 is positioned and energized by a pair of high tension lead wires 39 which cause the light 27 to be flashed at a rate slower than both the light 25 and the light 26. The light 27 is visible through an angle of 120 degrees to the rear of the plane and is designated as the recording zone on the chart of Fig. 6. All of the high tension leads 29, 34 and 39 may be attached to a suitable source of intermittent high tension current. As will be obvious to those skilled in the art, the rate of flashing can be controlled by such means as a monitoring system wherein the lights flash in simultaneous timed frequency, preferably multiples of one another, or may be flashed in any other means by which the differential in rate can be properly established.

The type of lights which I prefer is a condenser discharge type such as is commonly used in photography and is known as the Strobe light. The color temperature of these Strobe lights is in the neighborhood of 7100 degrees Kelvin, which is more than ordinary daylight which is about 5900 degrees Kelvin. The ordinary incandescent electric light bulb has a color intensity of around 2800 to 3000 degrees Kelvin. It will be readily appreciated that the high color temperature renders the light more visible in hazy or foggy conditions and the penetration under such conditions is quite remarkable.

From the standpoint of physical reaction to a light of this character, it has been shown that the high color intensity of a Strobe light renders the light visible through a wider angle at each side of the pilot's line of sight whereas colored lights will be visible through an angle of 110 degrees on either side of the straightforward line of vision. The nerve endings in the retina behind the cornea of a pilot's eye are capable of picking up the high color intensity light at a much wider angle than the colored lights such as red, green and blue which can be seen only by the nerve endings which are concentrated more fully at that portion of the retina lying immediately behind the lens. As pointed out previously in this specification, it is desirable to use the highest degree of attention since the inherent movement of a dangerous plane is not of itself capable of establishing a warning signal through relative movement. I have found that $\frac{1}{1000}$ of a second is sufficient for each flash and the very short period of time will make for a longer life of the bulb since the actual burning time over a given time interval is extremely short. The type of Strobe bulbs which I prefer in my equipment have been tested for endurance up to seven million flashes. Since the Strobe light is cold, there is no problem involved in dissipating heat. The penetration of the high color intensity flashing bulb which I use has a visibility at distances up to around fifty miles on a clear night and has a visibility as high as seven eighths of a mile in a snowstorm at 10:00 a.m. when normal visibility was only one half mile. The bulb is therefore excellent for twilight and hazy daylight flying as well as for night flying.

Referring again to Fig. 6 and Fig. 8, it will be seen that a good visibile and distinguishable flashing light for the collision zone is one which will flash 120 times per minute or at the equivalent rate of twice per second. The light in the potential danger zone has been arbitrarily selected to flash at the rate of 48 times per minute or the equivalent of four times in five seconds. In the recording zone, the light has been selected to flash at a rate of 20 times per minute which is equivalent to one flash every 3 seconds. The difference in the rate of flashing is easily distinguishable and no difficulty should be encountered in determining which of the zones is visible to a pilot in the vicinity of an airplane equipped with my apparatus.

It is of course highly desirable that all planes be equipped with the same type of relative danger equipment herein disclosed and utilizing the same system. It might be pointed out that although a commercial transport having an average speed of 360 miles per hour has been selected as the criterion in determining the best angles for baffling, it is also possible and perhaps desirable to establish two different angle zones for classes of aircraft which travel at speeds widely variant from those of commercial transports. For example, a 700 miles per hour jet airplane would travel approximately twice as fast as the average commercial plane. Since the likelihood of a slower plane being on a collision course with the jet plane is less (although once on a collision course, the closing time is actually faster) it is desirable to have a smaller sector designating the collision zone because of the higher speed. Conversely, for a light plane which would cruise at 100 miles per hour, the collision zone would be made somewhat wider than that selected for the average commercial planes. The potential danger zones and recording zones would be adjusted accordingly, the likelihood of collision rearwardly of a high speed jet being considerably less than that with an airplane flying at 100 miles per hour.

My invention, in essence, presupposes a plurality of easily visible, flashing lights, each giving a degree of warning according to the rapidity of the flash and each being baffled so as to beam its light outwardly in a zone which if within the vision of a pilot in the vicinity, will automatically warn him of the degree of danger of collision by virtue of the projected paths of travel of the planes which are a function of the zones established.

It may thus be seen that I have devised a novel and useful method for warning pilots of mutual danger of collision and have provided an economical and reliable apparatus for carrying out the method which is designed to reduce accidents from collision resulting particularly from congested flight conditions.

What is claimed is:

1. An apparatus adapted to be attached to an aircraft for warning an observer in air flight in the vicinity of the aircraft of the relative danger of collision therebetween which comprises, a plurality of lights, each having a high intensity, intermittently flashing light, the flashing rate being detectably different in each of said lights and characteristically defining a relative degree of danger of collision, a shield disposed partially about each of said lights to restrict the outward beaming of its associated light to a horizontal sector including all direct, interconnecting lines between an observer and said aircraft which define instantaneous locations in which the indicated degree of danger exists.

2. In a collision warning apparatus for attachment to an aircraft, the combination with said aircraft of a plurality of lights mounted exteriorly in fixed relation thereto, and shield means partially surrounding each of said lights and defining a visible, horizontal beam zone characteristic of the relative danger of collision between an observer of the light and the aircraft, and means operable to flash intermittently at a relatively low rate, one of said light beams directed rearwardly of the aircraft and to flash intermittently at a relatively higher rate, a light beam directed laterally outward from the aircraft and to flash intermittently at a still higher rate, a light beam directed forwardly of the airship, the rates of flashing being independently distinguishable and directly indicative of the relative degree of danger of collision between an observer of a light and the aircraft upon which the lights are mounted.

3. An apparatus adapted to be attached to an aircraft for warning an observer in air flight in the vicinity of the aircraft of the relative danger of collision therebetween which comprises, a plurality of lights, each having a high intensity, a shield disposed partially about each of said lights to restrict the outward beaming of its associated light to a horizontal sector including all direct lines between an observer and said aircraft which define a zone within which only one of said lights can be observed, and means flashing each of the lights intermittently at a constant but distinguishing rate indicative of the degree of danger existing when the light is observed.

References Cited in the file of this patent

UNITED STATES PATENTS

| 2,365,038 | Adler | Dec. 12, 1944 |
| 2,605,384 | Adler | July 29, 1952 |
| 2,777,120 | Madsen | Jan. 8, 1957 |

FOREIGN PATENTS

| 239,688 | Great Britain | Sept. 17, 1925 |
| 428,291 | Great Britain | May 10, 1935 |